US006552679B2

(12) United States Patent  (10) Patent No.: US 6,552,679 B2
Sassman et al.  (45) Date of Patent: Apr. 22, 2003

(54) TRACK GROUPER

(75) Inventors: Steven Michael Sassman, Palm Bay, FL (US); Noel Collins, Melbourne Beach, FL (US); Kirk D. Moore, Palm Bay, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 27 days.

(21) Appl. No.: 09/961,732

(22) Filed: Sep. 24, 2001

(65) Prior Publication Data

US 2003/0058157 A1 Mar. 27, 2003

(51) Int. Cl.[7] .............................................. G01S 13/00
(52) U.S. Cl. .................................... 342/90; 342/96
(58) Field of Search ............................ 342/37, 76, 95, 342/90, 96

(56) References Cited

U.S. PATENT DOCUMENTS

| | | | | |
|---|---|---|---|---|
| 5,130,715 A | * | 7/1992 | Yanagisawa | ................ 342/158 |
| 5,309,159 A | * | 5/1994 | Shahaf et al. | ................ 342/179 |
| 5,909,189 A | * | 6/1999 | Blackman et al. | ........... 342/108 |
| 6,239,739 B1 | * | 5/2001 | Thomson et al. | ........... 342/195 |
| 6,260,759 B1 | * | 7/2001 | Nguyen et al. | .............. 235/411 |

* cited by examiner

Primary Examiner—Thomas H. Tarcza
Assistant Examiner—Isam Alsomiri
(74) Attorney, Agent, or Firm—Stetina Brunda Garred & Brucker (57) ABSTRACT

There is provided a method for tracking a group having at least two targets. The method may comprise selecting the at least two targets from a plurality of targets. The at least two targets may be selectable based upon their respective target datum thereof. Thereafter, a dual gate surrounding each respective one of the at least two targets is defined, wherein a movement of each dual gate is synchronized with a movement of respective one of the at least two targets corresponding thereto. The dual gate of each respective one of the at least two targets may then be associated with each other to form the group.

41 Claims, 7 Drawing Sheets

EXAMPLE OF DUAL GATE THRESHOLDS

Fig. 1

EXAMPLE OF DUAL GATE THRESHOLDS

Fig. 2

GROUP FORMATION

Fig. 4A

ADDING A MEMBER TO A GROUP

SIMPLE MERGE EXAMPLE

*Fig. 5A*

INTERMITTENT MERGE EXAMPLE

*Fig. 5B*

GROUP SPLIT - GROUP DELETED

Fig. 6A

GROUP SPLIT - MEMBER REMOVAL

Fig. 6B

GROUP SPLIT - MULTIPLE GROUPS FORMED

Fig. 6C

TRACK GROUPER HISTORY RESULT

Fig. 7A

TRACK GROUPER ANCESTRY RESULTS

Fig. 7B

TRACK GROUPER

STATEMENT RE: FEDERALLY SPONSORED RESEARCH/DEVELOPMENT

This invention was made with Government support under contract F30602-97-C-0128 awarded by the United States Government. The Government has certain rights in this invention.

CROSS-REFERENCE TO RELATED APPLICATIONS (Not Applicable)

BACKGROUND OF THE INVENTION

The present invention generally relates to a method of tracking groups, and more particularly to an improved method of tracking groups while facilitating group continuity and establishing a plurality of alternate new groups thereafter in response to performing one of three operational modes.

The concept of group tracking in commercial and military applications is well known. Group tracking may have wide variety of applications in the aerospace industry, substantially extending to all forms of military related operations. More specifically, the concept of group tracking may prove to be valuable during times of hostility, such as in warfare for example. Thus, group tracking has become a vital and integral process in the aerospace industry, as well as other related industries.

In particular, group tracking may yield advantages in both offensive and defensive settings. By way of example, the concept of group tracking may be applicable to analyze and identify enemy targets for the purpose of launching strategic offensive strikes thereagainst. In the alternative, group tracking may further be used to exploit enemy targets so that calculated defensive maneuvers may be taken thereby. Simply put, the concept of group tracking is a necessary and bona fide tool in times and environments of hostility.

However, group tracking has its share of disadvantages. More specifically, group tracking algorithms currently being utilized are user-unfriendly and limited in capabilities. When such algorithms transition into a readable form on a radar display, a highly skilled personnel may be needed to unravel such manifestation. More particularly, the current group tracking algorithms may be sensitive to even slightest variations in the received data. Such sensitivity may propagate the detected groups (e.g., an aggregate of targets) to constantly change in form such that its membership certainty and group continuity are significantly mitigated. Therefore, an increase in display clutter and a decrease in battle management picture may occur as a result.

Moreover, the current group tracking algorithms may further produce adverse effects of measurement miscorrelations and false alarms because they are dependent upon noisy sensor measurements. Such adverse effects may oftentimes be costly when strategic and calculated military operations are involved. In other words, even a slightest mistake in exploitation of enemy targets may defeat the whole purpose of conducting strategic and calculated military operations.

In addition, the group tracking algorithms currently being utilized are limited in their functional capabilities. The current group tracking, although confusingly done, is believed to merely facilitate in displaying the present locations of the enemy targets. More specifically, a description of group history or group ancestry may not be readily available to aid the user in performing an overall anaylsis (e.g., battle analysis) of the situation at hand. Even further, a simultaneous display of group history and group ancestry, along with the present locations of the enemy targets, may not be accessible to the user thereby lessening the effectiveness of the target grouping algorithms.

Thus, there has long been a need in the industry, and in the aerospace industry in particular, for a method of tracking groups while facilitating membership certainty and group continuity. Moreover, there is further a need to decrease display clutter and simultaneously enhance battle management picture when being produced on a display. In particular, there is a need to make available group history and group ancestry when access thereof is desired by the user.

The present invention addresses and overcomes the above-described deficiencies by providing a method that utilizes a plurality of kinematic dual gates to facilitate association between targets in a group to increase membership certainty and group continuity. Moreover, the tracking group algorithm of the present invention provides a series of operational modes for establishing a plurality of alternate new groups and further having the capability to depict a group history and a group ancestry thereof. In this respect, not only does the present invention improve upon the prior art in terms of membership certainty, group continuity, and functional capability, but it also decreases display clutter and enhances battle management picture thereby.

BRIEF SUMMARY OF THE INVENTION

In accordance with a preferred embodiment of the present invention, there is provided a method for tracking a group having at least two targets. The method may comprise observing a plurality of targets, wherein each respective one of the plurality of targets has a target datum. The at least two targets are selectable from the plurality of targets. The at least two targets may be selectable based upon the respective target datum thereof.

Thereafter, a dual gate surrounding each respective one of the at least two targets may need to be defined. Furthermore, a movement of each dual gate should be determined, wherein the movement of each dual gate is synchronized with a movement of respective one of the at least two targets corresponding thereto. The dual gate of each respective one of the at least two targets may then be associated with each other. In response to such dual gate association, the group is formed. More specifically, the at least two targets are maintainable in the group as long as the association of the dual gate therebetween remains intact thereby facilitating continuity of the group.

In accordance with the methods employed in the present invention, observations of the plurality of targets may need to be received. By doing so, at least two substantially identical target data from the plurality of targets may be selected. As a result, the at least two targets corresponding to the at least two substantially identical target data may then be selected. The target datum may be chosen from the collection consisting of a target position, a target speed, a target heading, and combinations thereof.

Moreover, the plurality of targets may be ground moving targets. In addition, the dual gate of each respective one of the at least two targets comprises an inner gate and an outer gate. The inner gate and the outer gate may each have a generally rectangular configuration. More particularly, the inner gate surrounds a respective one of the at least two targets corresponding thereto to create an inner buffer zone therebetween. Additionally, the outer gate further surrounds the inner gate corresponding thereto to create an outer buffer zone therebetween.

The dual gate of each respective one of the at least two targets may coincide with each other. Such coincidence of the dual gate may consist of an inner-to-inner buffer zone, an inner-to-outer buffer zone, an outer-to-outer buffer zone, and combinations thereof. Furthermore, each respective one of the at least two targets has a target periphery, whereas the inner gate has an inner gate periphery. The inner gate is spaced uniformly around the target periphery of the respective one of the at least two targets corresponding thereto. The outer gate is spaced uniformly around the inner gate periphery of the inner gate corresponding thereto.

In accordance with the methods employed in the present invention, movements of the at least two targets with respect to each other may be permitted as long as the association of the dual gate therebetween is preserved. By doing so, variations in the respective target datum corresponding to the at least two targets may be compensated so as to facilitate the continuity of the group. Moreover, an image representative of the group may be displayed on a display.

In a different embodiment of the present invention, one of three operational modes may be selected after forming the group. The three operational modes may consist of a group assignment mode, a group merge mode, and a group split mode. One of the three operational modes may be performed on the group for the purpose of forming a new group.

In particular, the group assignment mode may be selected. More specifically, at least two substantially identical target data may need to be selected from the plurality of targets. As a consequence, the at least two targets corresponding to the at least two substantially identical target data may then be selected. Thereafter, a group identification factor may be assigned to the at least two targets.

Furthermore, an another target is observed from the plurality of targets, wherein the another target may be moving towards the at least two targets. Next, the target datum of the another target is defined. The target datum of the another target may be generally same to the at least two substantially identical target data of the at least two targets. Thereafter, the another target may be merged to the at least two targets so as to share the group identification factor therebetween.

The group merge mode may also be selected. More particularly, at least two substantially identical target data is selected from the plurality of targets. By doing so, the at least two targets corresponding to the at least two substantially identical target data may then be selected. Consequently, a first group identification factor may be assigned to the at least two targets.

In addition, at least two different targets may also be observed. The at least two different targets may share substantially identical target data therebetween. As a result, a second group identification factor may be assigned to the at least two different targets. The at least two targets and the at least two different targets may converge toward one another so as to share the substantially identical target data therebetween. Thus, a third group identification factor may then be assigned to the at least two targets and the at least two different targets.

Moreover, the group split mode may be selected. More specifically, the group is observed, wherein all of the at least two targets in the group is diverging away from each other. The target datum of each respective one of the at least two targets is substantially different from one another in response to the divergence. Thereafter, the group is then eliminated based upon the substantially different target datum between all of the at least two targets.

In the alternative, only one of the at least two targets may diverge away from the at least two targets. In particular, the target datum of one of the at least two targets may be substantially different from the target datum of each respective one of the at least two targets. Thus, one of the at least two targets may be eliminated from the group based upon the substantially different target datum between one of the at least two targets and each respective one of the at least two targets.

Furthermore, some of the at least two targets may diverge away from the at least two targets. Each target datum of some of the at least two targets may be substantially different from the target datum of each respective one of the at least two targets. Consequently, some of the at least two targets is eliminated from the group based upon the substantially different target datum between some of the at least two targets and each respective one of the at least two targets.

Even further, some of the at least two targets eliminated from the group may be observed. Each target datum of some of the at least two targets may be substantially identical to each other. In response, a second group comprised of some of the at least two targets is formed. The second group is formed based upon each target datum of some of the at least two targets being substantially identical to each other.

In accordance with the methods employed in the present invention, a group database may be used to record group information as the group transitions into the new group. More specifically, the group information is retrieved from the group database, wherein an image representative of the group information is displayed on the display. Additionally, an image representative of the new group may be displayed on a display.

The group information may be a group history. The group history may be chosen from the collection consisting of a group origination time, a group origination location, a group termination time, a group termination location, an assigned group identification, a number of targets in the group, an identification of targets in the group, and combinations thereof. Moreover, the group information may be a group ancestry. The group ancestry may be chosen from the collection consisting of a group merge, a group split, and combinations thereof.

BRIEF DESCRIPTION OF THE DRAWINGS

These as well as other features of the present invention will become more apparent upon reference to the drawings wherein.

DETAILED DESCRIPTION OF THE INVENTION

Figure 1:
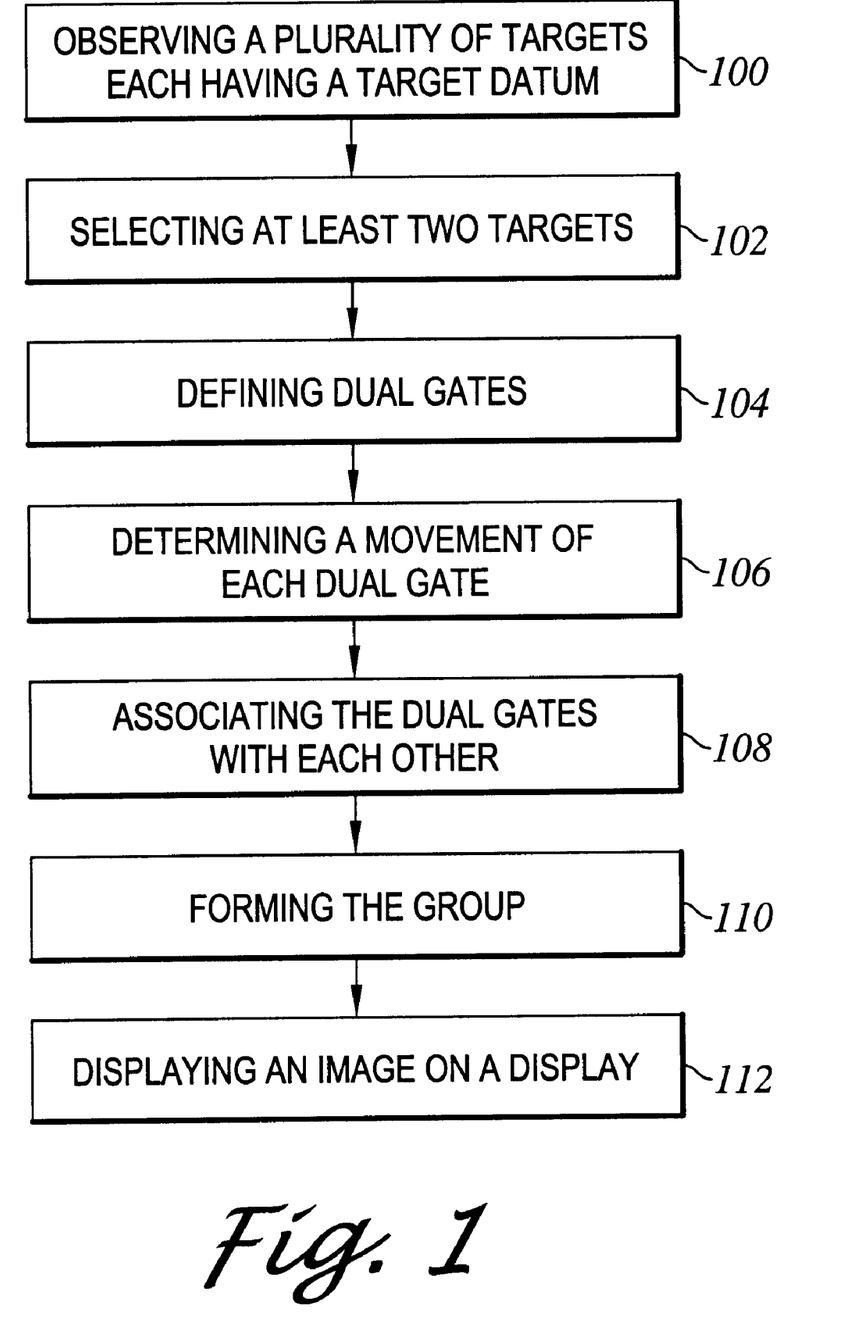
FIG. 1 is a flow diagram of the steps employed to track a group while facilitating group continuity in accordance with a preferred embodiment of the present invention.

Referring now to the drawings wherein the showings are for purposes of illustrating preferred embodiments of the present invention only, and not for purposes of limiting the same, FIG. 1 is a flow diagram of the steps employed to track a group 10 and facilitating group continuity thereof in accordance with a preferred embodiment of the present invention. As will be discussed below, the group 10 may be formed with the purpose of ascertaining target membership certainty and group continuity. In this regard, a dual gate 20 which surrounds each target 30 may be associated between each other to form the group 10. The dual gate 20 may have a variety of configurations, but a generally rectangular configuration is preferred.

Referring more particularly to FIG. 1, it is understood that the methods employed therein are exemplary in nature, and it is the concept of tracking a group 10 and further facilitating group continuity and member certainty that should be appreciated. Moreover, not all steps described in FIG. 1 have to be taken. More specifically, it would be obvious to one of ordinary skill in the art that certain ones of the steps described in FIG. 1 may be altered, modified, or rearranged to arrive at the same result. It is the concept of tracking groups 10 and achieving group continuity and membership certainty via utilization of dual gates 20 that should be recognized.

More particularly, the present invention is a product of rapid prototyping that demonstrates the group tracking capability. A user may visualize a plurality of targets 30. The visualization of the targets 30 may be displayed on a display, such as a radar display. A radar device, whether it is a conventional or a creative one, may be able to continuously receive observations of the plurality of targets 30 for displaying them on a display. For example, the radar device would display observations at times t, t+1, t+2 . . . t+n. Simply put, the radar device may be operative to continuously update the observations on the display such that the user is kept aware of the current observations. Moreover, it will be contemplated by those of ordinary skill in the art that such radar device may be utilized from/with a military vehicle (e.g., mounted on an aircraft platform) or a military base.

Each of the plurality of targets 30 may be defined by a target datum (step 100). The target datum may be individualistic and specific to each of the plurality of targets 30. The target datum may jointly and severally be defined as a target speed, a target heading, and a target position. Such is true especially for ground moving targets. However, one of ordinary skill in the art may realize that technological advances in the future may include additional datum such as length, hostile target I.D. and platform I.D. that will enable better group refinement.

When the user visualizes the plurality of targets 30, at least two of those targets 30 may be selected therefrom based upon the target datum of those selected targets 30 (step 102). More particularly, at least two targets 30 which share substantially identical target data may be selected from the plurality of targets 30. A minimum of two targets 30 are selected to form the group 10 because a group 10 comprised of only one target 30 may not provide new information/target datum about the battle space. However, in retrospect, it may be possible to process groups 10 of one target 30 within the algorithm and display groups 10 of two or more targets 30.

The group tracking algorithm of the present invention may be a formation group tracking (FGT) algorithm. The FGT algorithms generate groups 10 using established tracks. The targets 30 are "tracked" separately and fed to a process that forms the groups 10. Because extrapolated tracks may be used, missing observations may not affect the group position or count. The price of these added benefits is increased CPU and memory usage.

As stated above, at least two targets 30 that have the substantially identical target data may be selected from a plurality thereof. In other words, at least two substantially identical target data may be identified to select the at least two targets 30 corresponding thereto. Simply put, at least two substantially identical target data may denote similarity in the target position, the target speed, and/or the target heading between the corresponding targets 30.

Moreover, the targets 30 may be defined as any type of mobile objects, such as military vehicles for example. Even further, such military vehicles may be airborne, ground, and/or underwater military vehicles. However, the group tracking algorithm of the present invention is designed to enhance moving target exploitation of ground threats. The ground target environment may present a greater challenge than the air tracking environment because its target density is larger, lacks identifying attributes, and terrain features hinder target observability. Therefore, the group tracking algorithm of the present invention, even though workable with other forms of vehicles, may prove to be most effective on ground moving targets.

Figure 2:
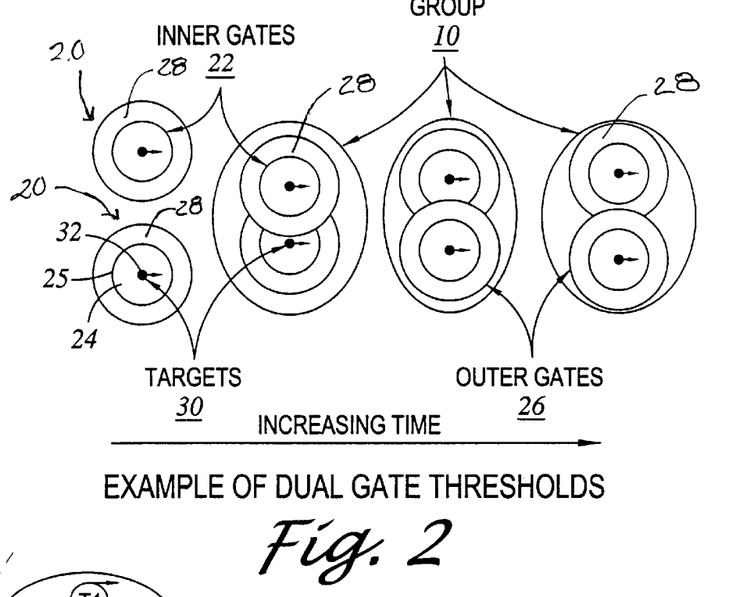
FIG. 2 is a symbolic diagram representing an exemplary dual gate surrounding each target to facilitate group continuity, further illustrating inner and outer gates to respectively create inner and outer buffer zones thereby.

Referring now to FIGS. 1 and 2, a dual gate 20 needs to be defined (step 104). As mentioned above, the dual gate 20 may surround each of the targets 30. As will be discussed in more detail below, the dual gate 20 of each target 30 is a kinematic dual gate.

In conformance with the above, the at least two selected targets 30 will each have a respective dual gate 20 therearound. The group tracking algorithm of the present invention may use two sets of linear gates for group membership evaluation. Smaller dual gates 20 may be used for performing a group assignment mode and a group merge mode, whereas larger dual gates 20 may be utilized for performing a group split mode, as such modes will be discussed in more detail below. Furthermore, gates sizes may be empirically derived from observations. The gate sizes may be fixed but configurable via a man-machine-interface (MMI).

Since the dual gate 20 is a kinematic dual gate, a determination of the dual gate movement must be determined (step 106). More specifically, the movement of each dual gate 20 may be synchronized with a movement of respective one of the selected targets 30 corresponding thereto. Simply put, the dual gate 20 may move where its corresponding target 30 moves to. Therefore, the movements of the dual gate 20 and the corresponding target 30 may correspond to each other.

More specifically, the dual gate 20 of each respective one of the targets 30 has an inner gate 22 and an outer gate 26. As mentioned above, the inner and outer gates 22, 26 each may define any configuration, but a generally rectangular configuration is preferred. The inner gate 22 may surround the corresponding target 30, namely, the target periphery 32 thereof. Such relationship forms an inner buffer zone 24 that is positioned between the periphery 32 of the target and the inner gate 22. When the inner gate 22 is squarish or circular in shape, the inner gate 22 may be characterized to be spaced uniformly around the corresponding target periphery 32. In other words, the inner gate 22 may be equally distanced around the target periphery 32.

Furthermore, the outer gate 26 may surround the inner gate 22, namely, the inner gate periphery 25 thereof. Such relationship forms an outer buffer zone 28 that is positioned between the periphery 25 of the inner gate 22 and the outer gate 26. Moreover, when the inner gate 22 is squarish or circular in shape, and the outer gate 26 is correspondingly the same therearound, the outer gate 26 may be characterized to be spaced uniformly around the inner gate periphery 25. In other words, the outer gate 26 may be equally distanced around the inner gate periphery 25.

After at least two targets 30 are selected from the plurality of targets 30 based upon their similar target data, such selected targets 30 may be defined to form the group 10. More specifically, the group formation may occur as the dual gates 20 of the selected targets 30 associate between each other (step 108). The dual gate 20 of each respective one of the at least two selected targets 30 may coincide with each other to be associated therebetween. As the dual gates 20 coincide, such association may occur between an inner-to-inner buffer zone 24, 24, an inner-to-outer buffer zone 24, 28, an outer-to-outer buffer zone 28, 28, and any combinations or hybrids therebetween. As such variety of interactions occur between the buffer zones 24, 28 of their respective dual gates 20, the targets 30 may define a group 10 as a result.

Subsequent to associating the dual gates 20 between their respective targets 30, a group 10 is formed (step 110). The targets 30 may be maintained in the group 10 as long as the association of their respective dual gates 20 remains intact. By maintaining such association, the group 10 may continue to exist.

Since there are both the inner gate 22 and the outer gate 26 which jointly form the inner buffer zone 24 and the outer buffer zone 28, the group continuity is facilitated. As previously mentioned, interactions between any of the buffer zones 24, 28 may define a group 10. As a result, the targets 30 that form the group 10 may be free to move with respect to each other as long as the association of their dual gates 20 is preserved.

Further, variations in the respective target datum corresponding to the at least two selected targets 30 may be compensated so as to facilitate the continuity of the group 10. An image that is representative of the formed group 10 may be displayed on the display (step 112), such as the radar display. Therefore, even though the targets 30 in the group 10 may vary their respective target datum (e.g., heading, speed, position, etc.), the group continuity appearing on the display, for example, is preserved thereby ascertaining the identities and/or numbers of the targets 30 therein.

Moreover, the group tracking algorithm of the present invention may use different dual gates 20 to group road-constrained targets 30 because they are better behaved. For example, a convoy traveling on a narrow canyon road is limited in position, speed and heading by the lead vehicle and the canyon width. Road-constrained targets 30 are determined to be on a road using a road network database. These targets may be tagged with the network information and quick parameter comparisons are substituted for gate calculations. If two targets 30 are on the same road, or are heading toward or away from a common endpoint, the heading dual gate 20 may use this to simplify the comparison. If two road-constrained targets 30 do not meet these criteria, they are gated using unconstrained dual gates 20.

Figure 3:
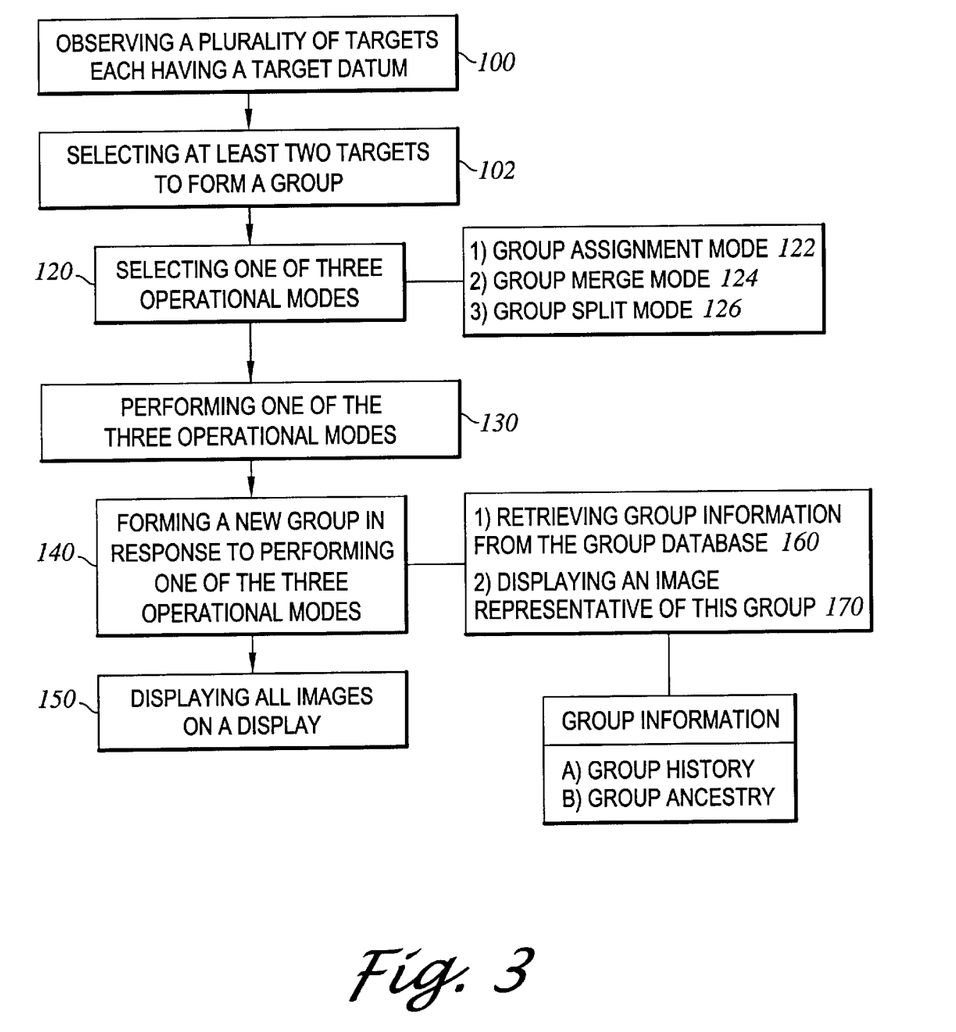
FIG. 3 is a flow diagram of the steps employed to track a group, and further illustrating establishments of a plurality of alternate new groups in response to performing one of three operational modes in accordance with a different preferred embodiment of the present invention.

Referring now to FIG. 3, the group tracking algorithm of the present invention may produce a further preferred embodiment. Incorporating the above in regards to forming the group 10, a plurality of alternate new groups may be established, as will be discussed in more detail below. Like above, a plurality of targets 30 may be observed to select at least two targets 30 therefrom based upon the substantially identical target data. However, one of three operational modes may be available to the user to form new groups.

After forming the group 10, the selected targets 30 may acquire different target data (e.g., position, heading, speed, etc.) so that their dual gates 20 are no longer associated. As the targets 30 are individually and/or jointly moved about, new groups may be formed in response thereto. More specifically, one of the three operational modes may be selectable (step 120). By performing one of the three operational modes (step 130), a number of different new groups may be established.

Figure 4A:
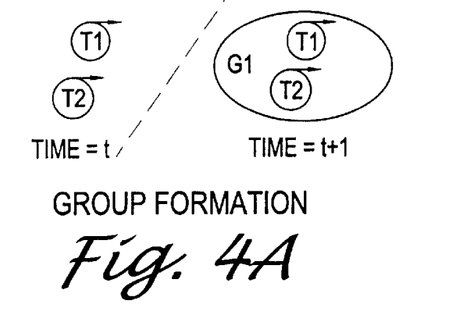
FIGS. 4A and 4B are symbolic diagrams representing assignments of group identifications to new groups via performing a group assignment mode.
Figure 4B:
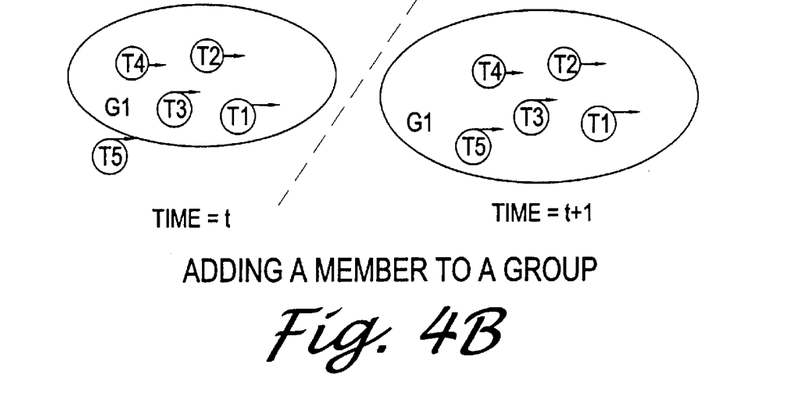

Referring more particularly to FIGS. 3, 4A and 4B, the first of the three operational modes is a group assignment mode. A group assignment mode can be selected (step 122) via the movement of the targets 30. In particular, when the group 10 is formed, a group identification factor may be assigned. For instance, and by way of example, FIG. 4A symbolizes a group formation comprised of two targets 30 and assigning a group identification factor "G1" thereto.

FIG. 4B portrays a slightly different concept than FIG. 4A. More specifically, a group formation having the group identification "G1" already exists. However, an another target 30 not in the group 10 may be further observed as to its respective target datum. The another target 30 not in the group 10 may move towards the group formation "G1". As the another target 30 approaches the group formation "G1", its target datum may become substantially identical to the target data shared by the targets 30 in the group formation "G1". When the another target 30 shares close enough target datum such that its dual gate 20 associates with one or more of the dual gates 20 of the "G1" targets 30, a merging between them may occur. When the another target 30 is merged to the group formation "G1", the group identification factor may be shared therebetween.

Figure 5A:
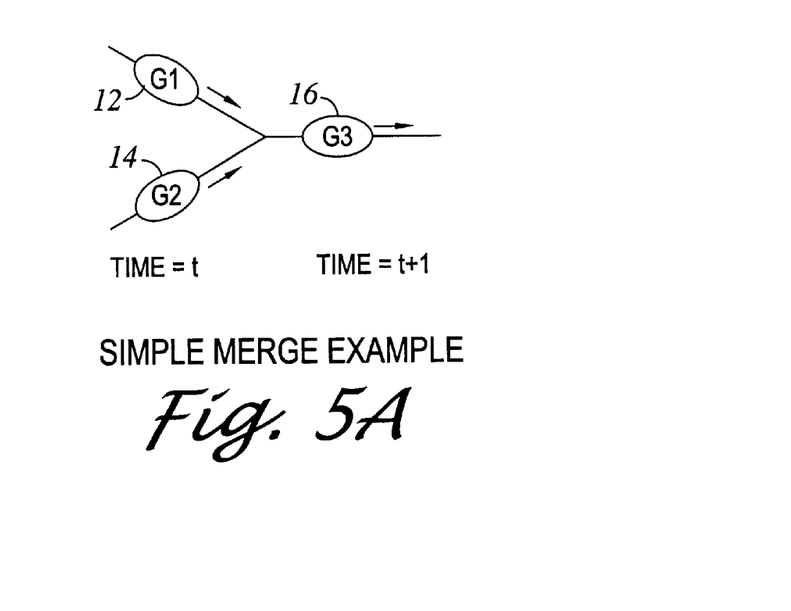
FIGS. 5A and 5B are symbolic diagrams representing formations of new groups via performing a group merge mode.
Figure 5B:
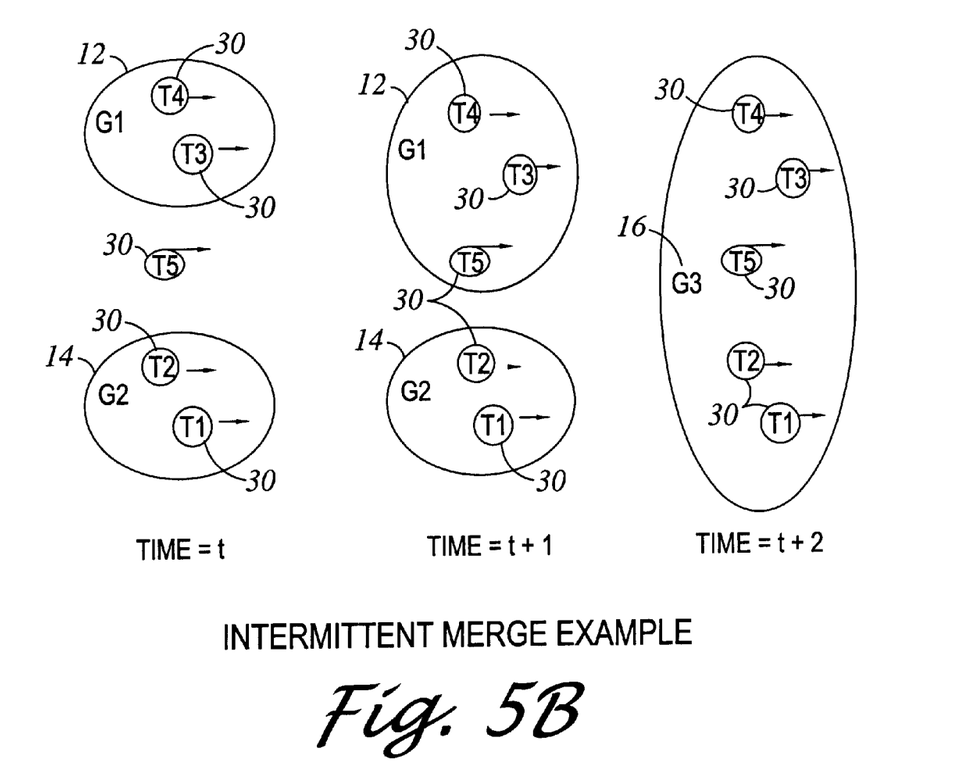

Referring now to FIGS. 3, 5A and 5B, the second of the three operational modes is a group merge mode. A group merge mode may be selected (step 124) via the movement of the targets 30. In the group merge mode, there may already exist one group formation with the group identification factor and/or more than one group formation each having their own respective group identification factors.

More specifically, a first group 12 comprised of at least two targets 30 may be defined and identified. Thereafter, a first group identification factor may be assigned to the at least two targets 30 of the first group 12. Moreover, a second group 14 comprised of at least two different targets 30 may also be observed and defined. Similar to the first group 12, a second group identification factor may be assigned to the at least two targets 30 of the second group 14.

When the first and second groups 12, 14 are defined, the at least two targets 30 of the first group 12 and the at least two different targets 30 of the second group 14 may converge toward one another. After such convergence, the first group 12 and the second group 14 transitions into a third group 16 because of the similarity in the target data therebetween. When the third group 16 is formed, a third identification factor may be assigned thereto.

Referring more particularly to FIGS. 3 and 6A–6C, a group split mode may be selected (step 126) depending on the movement of the targets 30. Three different approaches may be individually discussed as a way of example to describe the group split mode. Concentrating now on FIG. 6A only, a particular group 10 may be observed, in which all of the at least two targets in the group 10 diverges away from each other. In response to such divergence, the target datum of each respective one of the at least two targets 30 may be substantially different from one another. Therefore, the group 10 ceases to exist based upon the substantially different target datum between all of the at east two targets 30.

Figure 6A:
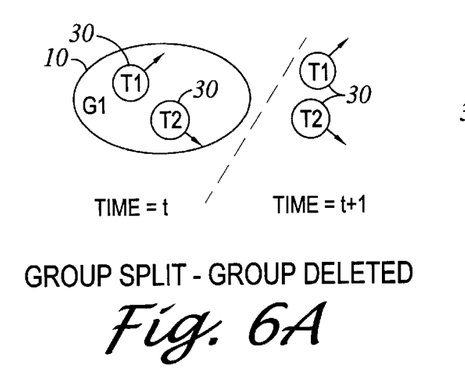
FIGS. 6A–6C are symbolic diagrams representing formations of new groups via performing a group split mode.
Figure 6B:
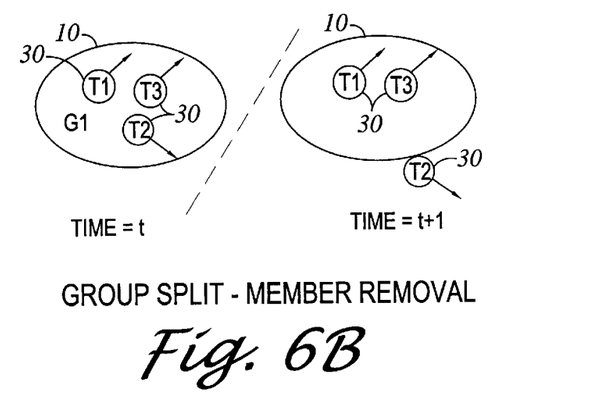

FIG. 6B illustrates a second example of the group split mode. More particularly, only one of the at least two targets 30 may diverge away from the at least two targets 30. Consequently, the target datum of one of the at least two targets 30 becomes substantially different from the target datum of each respective one of the at least two targets 30. Therefore, one of the at least two targets 30 is eliminated from the group 10.

Figure 6C:
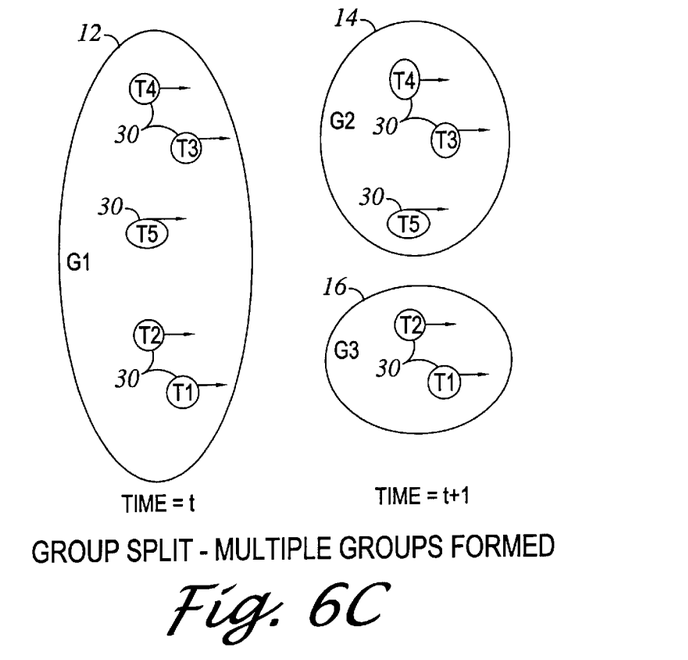

FIG. 6C shows a third example of the group split mode. In this example, some of the at least two targets 30 may diverge away from the group 10. As a result, each target datum of some of the at least two targets 30 becomes dissimilar from the target datum of each respective one of the at least two targets 30. Thus, some of the at least two targets 30 are eliminated from the group 10.

Continuing the above paragraph, the some of the at least two targets 30, when diverged away from the group 10, may share substantially identical target data. In such occurrence, a second group 14 may be formed thereamong. As stated above, a respective group identification factor labeling the second group 14 may be assigned thereto.

As discussed above, various new groups may be formed based upon performing one or more of the operational modes. More specifically, new groups are formed in response to performing one of the operational modes (via the group merge mode or the group split mode) (step 140), and group identification factors may be assigned via the group assignment mode. When new groups are formed, images representative thereof may be displayed on a display (step 150).

Figure 7A:
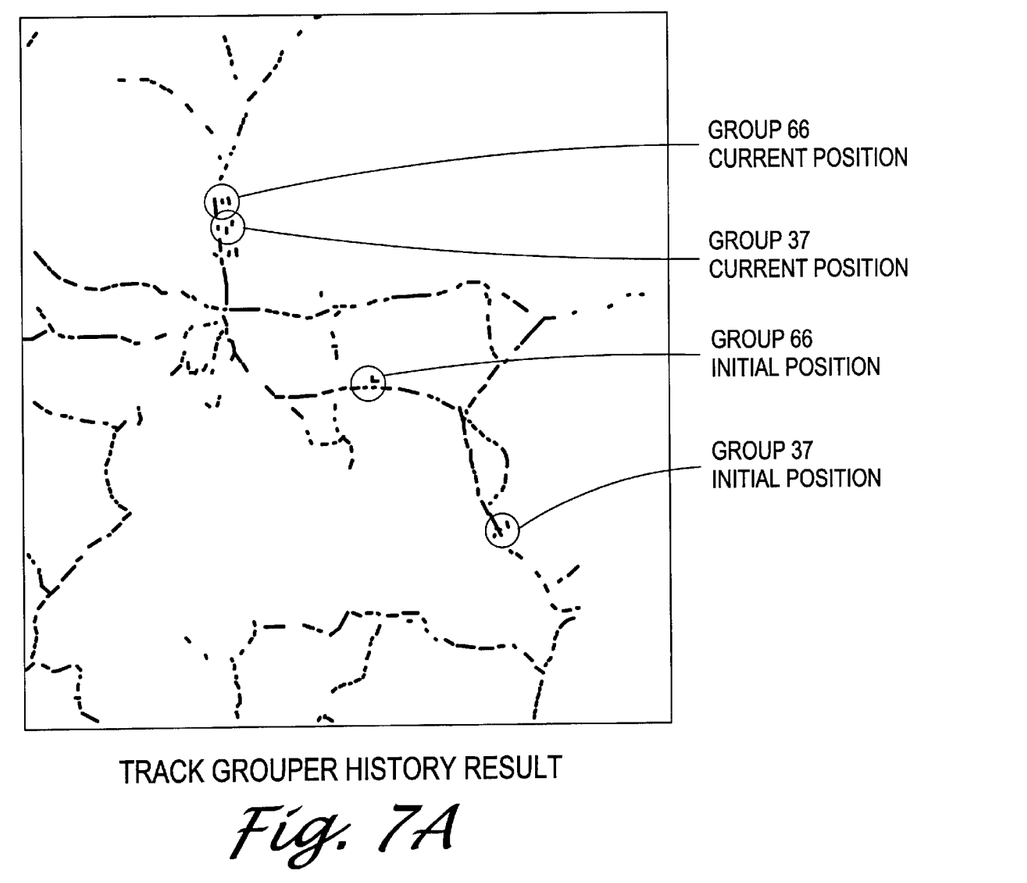
FIGS. 7A and 7B are symbolic diagrams representing groups and new groups formed therefrom, further illustrating group history and group ancestry therewith.
Figure 7B:
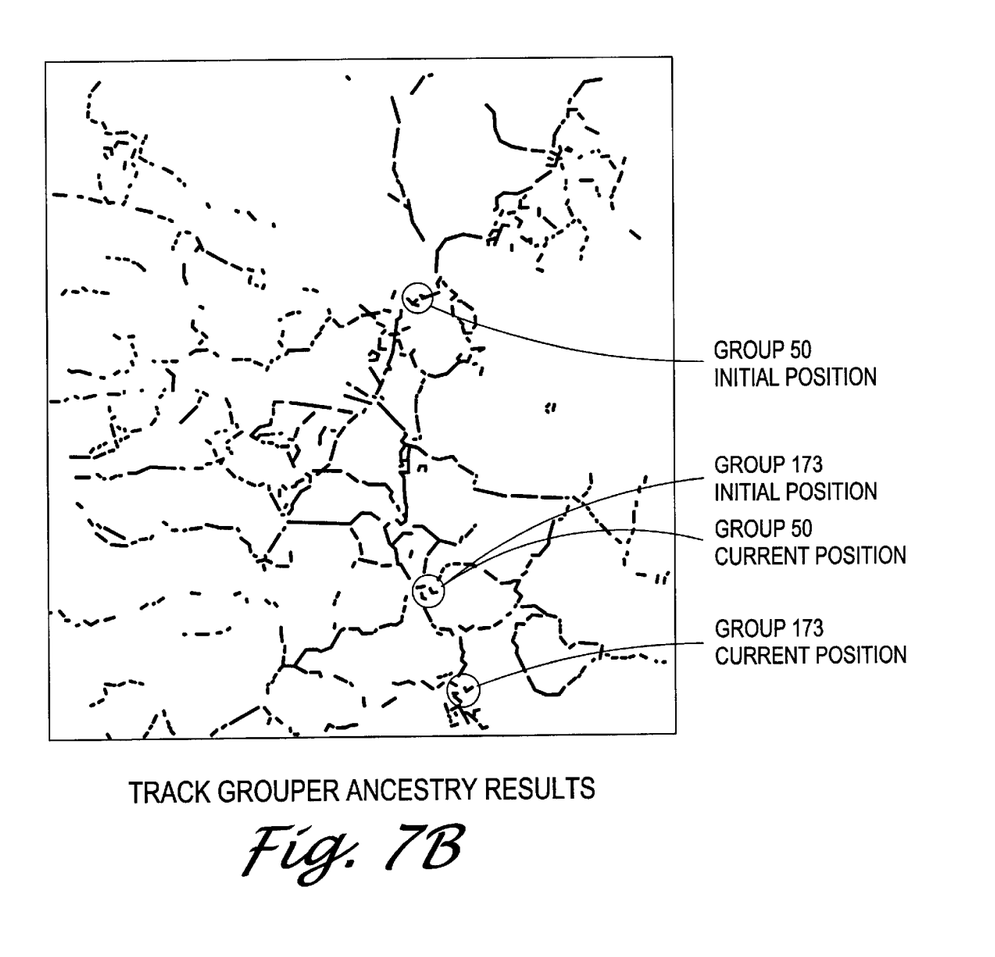

Referring now to FIGS. 3, 7A and 7B, the group tracking algorithm of the present invention may further yield advantages of providing group information. More specifically, a group database is used to record the group information as the group 10 transitions into one of the new groups. Such database provides the basis for linking the groups 10 between update periods to form the group information. The group information may be retrieved from the group database (step 160). Furthermore, an image representative of the group information is continuously displayable on the display (step 170). In particular, the group information may be displayed by itself or simultaneously with the present reflection of the target data of the targets 30.

The group information may be a group history and/or a group ancestry. More particularly, FIG. 7A shows an illustration of an example of the group history. As apparent therein, there are described two groups 10 each with their current and initial locations. Such depiction is merely a symbolic one. Simply put, the group history denotes a group's life. The group history may be any of a group origination time, a group origination location, a group termination time, a group termination location, an assigned group identification, a number of targets 30 in the group 10, an identification of targets 30 in the group 10, and/or combinations thereof.

FIG. 7B describes an example of the group ancestry. As apparent therein, there are described two groups 10 each with their current and initial locations. The results are similar to the group history but the trail is extended to show the transition of the group 10 into its new form. In other words, the trail is extended to show the parents of the group 10. Such depiction is merely a symbolic one. Simply put, the group ancestry shows a group's lineage that results from group splits and group merges. Therefore, the group ancestry may regard group merge, group split, and/or combinations thereof.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method for tracking a group having at least two targets, the at least two targets being selectable from a plurality of targets, the method comprising:

a) observing the plurality of targets, each respective one of the plurality of targets having a target datum;

b) selecting the at least two targets from the plurality of targets, the at least two targets being selectable based upon the respective target datum thereof;

c) defining a dual gate surrounding each respective one of the at least two targets;

d) determining a movement of each dual gate, the movement of each dual gate being synchronized with a movement of respective one of the at least two targets corresponding thereto;

e) associating the dual gate of each respective one of the at least two targets with each other; and f) forming the group in response to the dual gate of each respective one of the at least two targets being associated with each other, the at least two targets being maintainable in the group as long as the association of the dual gate therebetween remains intact thereby facilitating continuity of the group.

2. The method of claim 1 wherein b) comprises:

1) receiving observations of the plurality of targets;

2) selecting at least two substantially identical target data from the plurality of targets; and 3) selecting the at least two targets corresponding to the at least two substantially identical target data.

3. The method of claim 2 wherein the target datum is chosen from the collection consisting of a target position, a target speed, a target heading, and combinations thereof.

4. The method of claim 1 wherein the plurality of targets is ground moving targets.

5. The method of claim 1 wherein the dual gate of each respective one of the at least two targets comprises an inner gate and an outer gate.

6. The method of claim 5 wherein the inner gate and the outer gate each has a generally rectangular configuration.

7. The method of claim 5 wherein the inner gate surrounds a respective one of the at least two targets corresponding thereto to create an inner buffer zone therebetween, the outer gate further surrounding the inner gate corresponding thereto to create an outer buffer zone therebetween.

8. The method of claim 7 wherein e) comprises:
   1) coinciding the dual gate of each respective one of the at least two targets with each other, the coincidence of the dual gate consisting of an inner-to-inner buffer zone, an inner-to-outer buffer zone, an outer-to-outer buffer zone, and combinations thereof.

9. The method of claim 7 wherein each respective one of the at least two targets has a target periphery and the inner gate has an inner gate periphery, the inner gate being spaced uniformly around the target periphery of the respective one of the at least two targets corresponding thereto, the outer gate being spaced uniformly around the inner gate periphery of the inner gate corresponding thereto.

10. The method of claim 1 wherein f) comprises:
    1) permitting movements of the at least two targets with respect to each other as long as the association of the dual gate therebetween is preserved; and
    2) compensating for variations in the respective target datum corresponding to the at least two targets so as to facilitate the continuity of the group.

11. The method of claim 1 further comprising:
    g) displaying an image representative of the group on a display.

12. A method for tracking a group having at least two targets, the at least two targets being selectable from a plurality of targets, the method comprising:
    a) observing the plurality of targets each having a dual gate surrounding therearound, each respective one of the plurality of targets having a target datum;
    b) selecting the at least two targets from the plurality of targets to form the group in response to the dual gate of each respective one of the at least two targets being associated with each other, the at least two targets being selectable based upon the respective target datum thereof;
    c) selecting one of three operational modes after forming the group, the three operational modes consisting of a group assignment mode, a group merge mode, and a group split mode;
    d) performing one of the three operational modes on the group; and
    e) forming a new group in response to performing one of the three operational modes.

13. The method of claim 12 wherein b) comprises:
    1) receiving observations of the plurality of targets;
    2) selecting at least two substantially identical target data from the plurality of targets; and
    3) selecting the at least two targets corresponding to the at least two substantially identical target data to form the group.

14. The method of claim 13 wherein the target datum is chosen from the collection consisting of a target position, a target speed, a target heading, and combinations thereof.

15. The method of claim 12 wherein the plurality of targets is ground moving targets.

16. The method of claim 12 wherein c) comprises:
    1) selecting the group assignment mode.

17. The method of claim 16 wherein d) comprises:
    1) defining the at least two targets of the group; and
    2) assigning a group identification factor to the at least two targets of the group.

18. The method of claim 17 wherein 2) further comprises:
    (a) observing an another target from the plurality of targets, the another target moving towards the at least two targets of the group;
    (b) defining the target datum of the another target, the target datum of the another target being generally same to the at least two substantially identical target data of the at least two targets; and
    (c) merging the another target to the at least two targets of the group so as to share the group identification factor therebetween.

19. The method of claim 12 wherein c) comprises:
    1) selecting the group merge mode.

20. The method of claim 19 wherein d) comprises:
    1) defining the at least two targets of the group;
    2) assigning a first group identification factor to the at least two targets of the group;
    3) defining at least two different targets of the second group, the at least two different targets sharing substantially identical target data therebetween;
    4) assigning a second group identification factor to the at least two different targets of the second group;
    5) converging the at least two targets of the first group and the at least two different targets of the second group toward one another so as to share the substantially identical target data therebetween, the first group and the second group transitioning into a third group; and
    6) assigning a third group identification factor to the at least two targets and the at least two different targets of the third group.

21. The method of claim 12 wherein c) comprises:
    1) selecting the group split mode.

22. The method of claim 21 wherein d) comprises:
    1) observing the group, all of the at least two targets in the group diverging away from each other, the target datum of each respective one of the at least two targets being substantially different from one another in response to the divergence; and
    2) eliminating the group based upon the substantially different target datum between all of the at least two targets.

23. The method of claim 21 wherein d) comprises:
    1) observing the group, one of the at least two targets diverging away from the at least two targets, the target datum of one of the at least two targets being substantially different from the target datum of each respective one of the at least two targets; and
    2) eliminating one of the at least two targets from the group based upon the substantially different target datum between one of the at least two targets and each respective one of the at least two targets.

24. The method of claim 21 wherein d) comprises:
    1) observing the group, some of the at least two targets diverging away from the at least two targets, each target datum of some of the at least two targets being substantially different from the target datum of each respective one of the at least two targets; and
    2) eliminating some of the at least two targets from the group based upon the substantially different target datum between some of the at least two targets and each respective one of the at least two targets.

25. The method of claim 24 wherein 2) further comprises:
    i) observing some of the at least two targets eliminated from the group, each target datum of some of the at least two targets being substantially identical to each other; and ii) forming a second group comprised of some of the at least two targets, the second group being formed based upon each target datum of some of the at least two targets being substantially identical to each other.

26. The method of claim 12 wherein e) comprises:

1) using a group database to record group information as the group transitions into the new group.

27. The method of claim 26 wherein 1) further comprises:

i) retrieving the group information from the group database; and ii) displaying an image representative of the group information on the display.

28. The method of claim 26 wherein the group information is a group history, the group history being chosen from the collection consisting of a group origination time, a group origination location, a group termination time, a group termination location, an assigned group identification, a number of targets in the group, an identification of targets in the group, and combinations thereof.

29. The method of claim 26 wherein the group information is a group ancestry, the group ancestry being chosen from the collection consisting of a group merge, a group split, and combinations thereof.

30. The method of claim 12 further comprising:

f) displaying an image representative of the new group on a display.

31. A method for tracking a group from a plurality of targets, the method comprising the steps of:

a) selecting at least two targets each having a dual gate surrounding therearound from the plurality of targets;

b) forming the group in response to the dual gate of each respective one of the at least two targets being associated with each other.

32. The method of claim 31 wherein step a) comprises:

1) receiving observations of the plurality of targets;

2) selecting at least two substantially identical target data from the plurality of targets; and 3) selecting the at least two targets corresponding to the at least two substantially identical target data.

33. The method of claim 31 wherein step a) comprises:

1) determining a movement of each dual gate, the movement of each dual gate being synchronized with a movement of respective one of the at least two targets corresponding thereto.

34. The method of claim 31 wherein step b) comprises:

1) maintaining the group as long as the association of the dual gate between the at least two targets remains intact to thereby facilitate continuity of the group.

35. The method of claim 31 wherein the dual gate of each respective one of the at least two targets has a generally rectangular configuration.

36. The method of claim 31 further comprising the steps of:

c) selecting one of three operational modes after forming the group;

d) performing one of the three operational modes on the group; and e) forming a new group in response to performing one of the three operational modes.

37. The method of claim 36 wherein the three operational modes in step c) consists of a group assignment mode, a group merge mode, and a group split mode.

38. The method of claim 36 wherein step e) comprises:

1) using a group database to record group information as the group transitions into the new group.

39. The method of claim 38 wherein step 1) further comprises:

i) retrieving the group information from the group database; and ii) displaying an image representative of the group information on the display.

40. The method of claim 31 wherein the plurality of targets is ground moving targets.

41. The method of claim 36 further comprising the step of:

f) displaying an image representative of the new group on a display.

* * * * *